United States Patent [19]
Modica et al.

[11] Patent Number: 5,687,565
[45] Date of Patent: Nov. 18, 1997

[54] CONTROL OF EXHAUST EMISSIONS FROM AN INTERNAL COMBUSTION ENGINE

[75] Inventors: Frank S. Modica, Naperville; Mark K. Barr, Wheaton; George A. Huff, Naperville; Roger H. Cayton, Naperville; Bruce D. Alexander, Villa Park; Richard A. Kretchmer, Clarendon Hills, all of Ill.

[73] Assignee: Amoco Corporation, Chicago, Ill.

[21] Appl. No.: 564,479

[22] Filed: Nov. 29, 1995

[51] Int. Cl.$^6$ ............................................. F01N 3/00
[52] U.S. Cl. ............................................. 60/274; 60/297
[58] Field of Search ................................... 60/274, 297

[56] References Cited

U.S. PATENT DOCUMENTS

| | | | |
|---|---|---|---|
| 3,429,656 | 2/1969 | Taylor et al. | 23/2 |
| 3,443,886 | 5/1969 | Taylor et al. | 23/2 |
| 3,910,042 | 10/1975 | Yuge et al. | 60/286 |
| 4,041,128 | 8/1977 | Bramer et al. | 423/213.2 |
| 4,134,733 | 1/1979 | Volker et al. | 422/177 |
| 4,469,589 | 9/1984 | Yoo et al. | 208/120 |
| 4,472,267 | 9/1984 | Yoo et al. | 208/120 |
| 4,497,902 | 2/1985 | Bertolacini et al. | 502/65 |
| 4,985,210 | 1/1991 | Minami | 422/169 |
| 5,078,979 | 1/1992 | Dunne | 423/212 |
| 5,125,231 | 6/1992 | Patil et al. | 60/274 |
| 5,158,753 | 10/1992 | Take et al. | 422/173 |
| 5,303,547 | 4/1994 | Mieville et al. | 60/274 |
| 5,426,083 | 6/1995 | Bhattacharyya et al. | 502/411 |
| 5,499,501 | 3/1996 | Kato et al. | 60/286 |

FOREIGN PATENT DOCUMENTS

| | | | |
|---|---|---|---|
| 0 582 917 A1 | 2/1994 | European Pat. Off. | B01D 53/36 |
| 1444444 | 7/1976 | United Kingdom | F01N 3/15 |
| WO 94/11623 | 5/1994 | WIPO | F01N 3/20 |

OTHER PUBLICATIONS

William R. Leppard, "Sulfate Control Technology Assessment, Phase I: Literature Search and Analysis," PB-240 995, Report No. EPA-460/3-75-002-a prepared for the U.S. Environmental Protection Agency under Contract No. 68-03-0497, Nov. 1974.

I. Gottberg et al., "Sulphur Storage and Hydrogen Sulphide Release from a Three-Way Catalyst Equipped Car," SAE Technical Paper Series, Paper No. 890491, Feb. 27-Mar. 3, 1989.

*Primary Examiner*—John T. Kwon
*Attorney, Agent, or Firm*—Richard A. Kretchmer

[57] ABSTRACT

Exhaust gas emissions from an internal combustion engine are controlled through the use of a heat exchanger, a sulfur oxide absorbent, and a catalytic converter. The exhaust gas is contacted with the sulfur oxide absorbent before it is passed to the catalytic converter, and the heat exchanger is used to extract heat from the exhaust gas before the exhaust gas is contacted with the sulfur oxide absorbent. The heat extracted from the exhaust gas by the heat exchanger is then used to heat the catalytic converter. In a preferred embodiment, the exhaust gas is also contacted with a hydrocarbon adsorbent which: (1) adsorbs organic compounds, such as hydrocarbons, from the exhaust gas at the low temperatures which are typical of an engine cold-start, and (2) desorbs them at the higher temperatures which are reached after sustained engine operation.

23 Claims, 2 Drawing Sheets

5,687,565

CONTROL OF EXHAUST EMISSIONS FROM AN INTERNAL COMBUSTION ENGINE

FIELD OF THE INVENTION

This invention relates to a process and apparatus for the control of exhaust gas emissions from an internal combustion engine. More particularly, it relates to the use of a sulfur oxide absorbent in combination with a catalytic converter wherein indirect heat exchange is used to improve the combined performance of the absorbant and converter.

BACKGROUND OF THE INVENTION

The exhaust gas from a spark ignition or diesel engine which is operated on a hydrocarbon fuel will typically contain small amounts of carbon monoxide, organic compounds (such as hydrocarbons), nitrogen oxides and sulfur oxides which are undesirable emissions. The carbon monoxide and organic compounds result from incomplete combustion of the fuel, the nitrogen oxides are primarily a result of the combination of nitrogen and oxygen from the air which is used to burn the fuel in the engine, and the sulfur oxides result primarily from sulfur which is present as an impurity in the fuel. Small amounts of sulfur oxides can also result from sulfur compounds that may be present as components of the engine's lubricating oil.

Emission control systems for vehicles which are powered by an internal combustion engine typically include a catalytic converter which is used to catalyze the conversion of harmful emissions in the engine exhaust to gases which are less objectionable. Catalysts have been developed for use in catalytic converters which are highly effective in catalyzing: (1) the oxidation of organic compounds to water and carbon dioxide; (2) the oxidation of carbon monoxide to carbon dioxide; and (3) the conversion of nitrogen oxides to less objectionable products. However, the performance of such catalysts is often adversely affected by sulfur compounds which can act as catalyst poisons.

Sulfur oxide emissions can be controlled by reducing the amount of sulfur which is contained in the fuel. This approach will be used in California where the California Air Resources Board has established Phase 2 specifications for reformulated gasoline which become effective in March of 1996. These Phase 2 specifications define a maximum sulfur content for gasoline of 40 ppm as a flat limit for producers whereas, previously, conventional gasoline in California could contain up to 150 ppm of sulfur. Unfortunately, this approach is ultimately limited by the high cost of producing fuels which have a very low sulfur content.

It has been recognized for many years that the performance of a catalyst which is used to promote the destruction of hydrocarbons, carbon monoxide and nitrogen oxides in the exhaust gas from an engine can be improved if the catalyst is protected from catalyst poisons that can be present in the exhaust gas. For example, U.S. Pat. Nos. 3,443,886 and 3,429,656, both to Taylor et al. teach the use of a preconditioning zone containing a guard material which chemically reacts with and removes exhaust gas components, such as sulfur oxides, which would otherwise deactivate the catalyst. It is disclosed that a suitable guard material will contain a combination of 45 to 90 parts by weight of calcium as CaO, 5 to 30 parts by weight of $SiO_2$ and 5 to 25 parts by weight of sodium as $Na_2O$. It is further disclosed in the Taylor et al.—656 patent that the CaO—$Na_2O$—$SiO_2$ guard materials can be made more effective when used in association with oxides of metals from the group consisting of Cu, Mn, V, Cr, Fe, Co, Ni and Mo.

British Patent Specification No. 1,444,444 discloses that when a catalyst is used to promote the afterburning of exhaust gases from an engine, lead compounds and sulfur in the fuel and also phosphorous and zinc in the engine lubricating oil have an adverse affect on the catalyst performance. It is further disclosed that catalyst poisons in the exhaust gases can be removed by passing the exhaust gases through an absorptive material for such poisons prior to passage through the catalyst. The absorptive material is preferably formed of porous alumina pellets which are capable of absorbing lead compounds in the exhaust gases. It is disclosed that sulphur or phosphorous can also be absorbed by adding a substance which is reactive with sulfur or phosphorous.

Published European Patent Application No. 0 582 917 A1 (Goto et al.) is directed to an exhaust gas purification device for an engine wherein an $NO_x$ absorbent is used to absorb $NO_x$ emissions in the exhaust gas. It is disclosed that sulfur oxides in the exhaust gas have an adverse effect on the ability of the $NO_x$ absorbent to absorb $NO_x$. It is further disclosed that a sulphur trapping absorbent can be placed in the exhaust gas upstream of the $NO_x$ absorbent for the purpose of preventing sulfur oxides from flowing into the $NO_x$ absorbent. The $SO_x$ absorbent contains at least one substance selected from alkali metals, alkali-earth metals, rare-earth metals, and precious metals such as platinum. Alumina can be used as a carrier for the $SO_x$ absorbent.

Unfortunately, modern catalytic converters only operate after reaching temperatures in excess of about 300° C. For this reason, a substantial portion of hydrocarbon emissions from an internal combustion engine usually occur during the first few minutes of cold-start engine operation before the converter reaches its minimum effective operating temperature. This minimum effective operating temperature is frequently referred to as the converter "light-off" temperature. Because the first few minutes of operation are an integral part of automotive emissions tests, and because over 60% of the measured hydrocarbons can be emitted during the cold-start period of the test, a reduction of cold-start hydrocarbon emissions is of critical importance. Recent tightening of emissions requirements to limit emissions of certain hydrocarbon compounds, such as benzene, has further underscored the need for reduced cold-start hydrocarbon emissions.

The use of a sulfur absorbent to remove sulfur oxides from an exhaust gas before they can reach and poison a catalytic converter is an effective way to protect and maintain the activity and lifetime of the catalytic converter which is used to catalyze the conversion of carbon monoxide, organic compounds, and nitrogen oxides to less objectionable products. Although the use of such an absorbent solves one problem, it also creates an entirely new problem. A large quantity of absorbent must be used in view of the fact that it must have the ability to absorb significant quantities of sulfur oxides. By way of illustration, if a gasoline containing 150 ppm of sulfur and having a density of 6.5 pounds per gallon (0.7789 $g/cm^3$) is used as the fuel for an automobile that has an overall fuel economy of 20 miles per gallon (8.50 km/l), a total of 0.488 pounds (221 g) of sulfur will be discharged in the exhaust gas for every 10,000 miles (16,100 km) of operation. Accordingly, a significant mass of absorbent will be required to capture this sulfur. Because of its mass, the absorbent will absorb a significant amount of heat from the exhaust gases upon cold-start of the engine, and the presence of this heat sink will increase the amount of time required before the catalytic converter reaches its "light-off" temperature. Accordingly, the use of a sulfur oxide absorbent to protect the catalytic converter in accordance with the teaching of the prior art will cause an undesirable increase in cold-start hydrocarbon emissions.

The problem of cold-start hydrocarbon emissions has been addressed through the use of adsorbents which have the ability to adsorb hydrocarbons from the exhaust gas at low temperatures and then release the adsorbed hydrocarbons at higher temperatures when the catalytic converter has reached its "light-off" temperature. For example, U.S. Pat. Nos. 5,158,753 (Take et al.) and 5,303,547 (Mieville et al.) disclose processes wherein an adsorbent is used to adsorb organic substances from the exhaust gas in combination with a heat exchanger which transfers heat from the exhaust gas to the catalytic converter by means of a heat exchanger before the exhaust gas is passed through the adsorbent. At the low temperatures of a cold-start, the hydrocarbon adsorbent adsorbs hydrocarbons from the exhaust gas. As the hydrocarbon adsorbent is heated to high temperatures by continued exposure to the exhaust gas, the adsorbed hydrocarbons are desorbed and then passed to the catalytic converter which has been heated by indirect heat exchange.

Published International Patent Application No. WO 94/11623 (Burk et al.) is also directed to the use of a hydrocarbon adsorbent to reduce cold-start hydrocarbon emissions from an engine. More specifically, it discloses the treatment of an engine exhaust gas through the use of a first and a second catalyst zone and a hydrocarbon adsorbent zone between them, wherein the first and second catalyst zones are in heat transfer relation to one another. Heat transfer from the first catalyst zone to the second catalyst zone helps to bring the second catalyst therein more quickly to its effective operating temperature, and the hydrocarbon adsorbent in the adsorbent zone reduces the quantity of hydrocarbons discharged to the atmosphere during engine cold-start by adsorbing hydrocarbons from the exhaust gas until the second catalyst reaches a temperature at which it can more effectively convert the hydrocarbons to innocuous substances. This publication also teaches that air can be added to the exhaust gas stream at a point upstream of the second catalyst zone.

SUMMARY OF THE INVENTION

A variety of emission control systems have been developed for vehicles which are powered by an internal combustion engine. Some of these systems are quite effective for the control of hydrocarbon and carbon monoxide emissions through the use of catalytic converters. However, there is a continued need for an emission control system which is even more efficient in controlling exhaust gas emissions. In particular, there is a need for an emission control system which removes sulfur oxide emissions, protects the catalytic converter from deactivation by sulfur oxides, and minimizes hydrocarbon emissions during engine cold-start periods. We have found that such a system can be constructed through the use of: (1) a sulfur oxide absorbent to treat the exhaust gas before it is passed to the catalytic converter; and (2) a heat exchanger to transfer heat from the exhaust gas to the catalytic converter before said exhaust gas contacts the sulfur oxide absorbent.

One embodiment of the invention is a method for reducing the concentration of carbon monoxide, organic compounds and sulfur oxides in an exhaust gas from an internal combustion engine which comprises: (a) contacting the exhaust gas with a sulfur oxide absorbent in a first contacting zone and absorbing with the sulfur oxide absorbent at least a portion of the sulfur oxides in the exhaust gas wherein said sulfur oxide absorption is substantially irreversible at temperatures which are less than or equal to that of said exhaust gas; (b) contacting the effluent gas from said first contacting zone with a catalyst in a second contacting zone and catalyzing the conversion of at least a portion of the carbon monoxide and organic compounds in the effluent gas from said first contacting zone to innocuous products; and (c) transferring heat from the exhaust gas to said second contacting zone by indirect heat exchange.

Another embodiment of the invention is a method for reducing the concentration of carbon monoxide, organic compounds and sulfur oxides in the exhaust gas from an internal combustion engine which comprises: (a) contacting said exhaust gas with a first catalyst in a first contacting zone and catalyzing the conversion of at least a portion of the carbon monoxide and organic compounds to innocuous products with said first catalyst; (b) contacting the effluent gas from said first contacting zone with a sulfur oxide absorbent in a second contacting zone and absorbing with the sulfur oxide absorbent at least a portion of the sulfur oxides in said effluent gas from said first contacting zone; (c) contacting the effluent gas from said second contacting zone with a second catalyst in a third contacting zone and catalyzing the conversion of at least a portion of residual carbon monoxide and organic compounds in the effluent gas from said second contacting zone to innocuous products; and (d) heating said third contacting zone with heat that is removed from said first contacting zone by indirect heat exchange.

Another embodiment of the invention is an apparatus for reducing the concentration of carbon monoxide, organic compounds and sulfur oxides in an exhaust gas from an internal combustion engine which comprises: (a) absorber means which comprises a sulfur oxide absorbent for absorbing at least a portion of the sulfur oxides in the exhaust gas in a substantially irreversible manner at temperatures which are less than or equal to that of said exhaust gas; (b) catalytic converter means for receiving effluent gas from the absorber means, wherein said catalytic converter means comprises a catalyst which is effective for catalyzing the conversion of hydrocarbons into innocuous products; and (c) heat exchange means for transferring heat from the exhaust gas to the catalytic converter means by indirect heat exchange before said exhaust gas enters the absorber means.

A further embodiment of the invention is an apparatus for reducing the concentration of carbon monoxide, organic compounds and sulfur oxides in the exhaust gas from an internal combustion engine which comprises: (a) first catalytic converter means comprising a catalyst which is effective for catalyzing at least a portion of the carbon monoxide and organic compounds to innocuous products; (b) absorber means for receiving effluent gas from the first catalytic converter means, wherein said absorber means comprises a sulfur oxide absorbent for absorbing at least a portion of the sulfur oxides in the exhaust gas in a substantially irreversible manner at temperatures which are less than or equal to that of said exhaust gas; (c) second catalytic converter means for receiving effluent gas from the absorber means, wherein said second catalytic converter means comprises a catalyst which is effective for catalyzing the conversion of at least a portion of residual carbon monoxide and organic compounds in the effluent gas from the absorber means to innocuous products; and (d) heat exchange means for transferring heat from the first catalytic converter means to the second catalytic converter means by indirect heat exchange.

An object of the invention is to provide a method and apparatus for the improved removal of sulfur oxide emissions from the exhaust gas of an internal combustion engine.

An object of the invention is to provide an improved method and apparatus for the control of carbon monoxide, hydrocarbon, and sulfur oxide emissions in the exhaust gas from an internal combustion engine.

Another object of the invention is to provide a method and apparatus for protecting a catalytic converter from sulfur compounds which does not enhance the release of hydrocarbon emissions during engine cold-start periods.

A further object of the invention is to provide a method and apparatus for the removal of sulfur oxide emissions from an engine exhaust gas which simultaneously reduces hydrocarbon emissions during engine cold-start periods.

DETAILED DESCRIPTION OF THE INVENTION AND PREFERRED EMBODIMENTS

While this invention is susceptible of embodiment in many forms, specific embodiments are schematically shown in FIGS. 1 and 3–5, with the understanding that the present disclosure is not intended to limit the invention to the embodiments which are illustrated.

Figure 1:
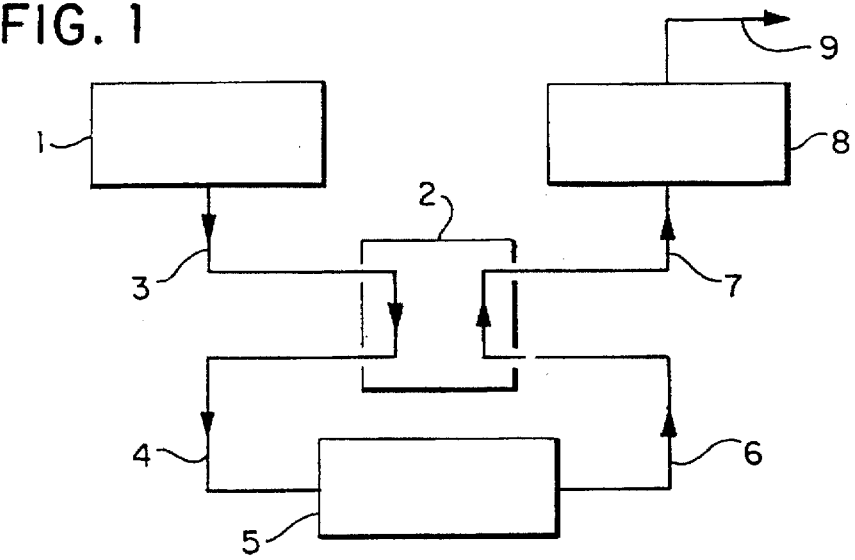
FIG. 1 of the drawings is a schematic representation of a first embodiment of the invention.

With reference to FIG. 1, exhaust gas from engine 1 flows through heat exchanger 2 by means of line 3 where heat is transferred from the hot exhaust gas to heat exchanger 2. The cooled exhaust gas then flows from heat exchanger 2 through line 4 to a sulfur oxide absorption zone 5. The exhaust gas then passes through sulfur oxide absorption zone 5 where sulfur oxides are removed from the exhaust gas through contact with a sulfur oxide absorbent. Effluent gas from sulfur oxide absorption zone 5 passes through line 6 to heat exchanger 2 where it is heated by the heat that it previously gave up during its initial passage through heat exchanger 2 via line 3. The heated exhaust gas is then discharged from heat exchanger 2 through line 7 and passed to catalytic converter 8. At least a portion of any carbon monoxide and organic compounds in the exhaust gas are catalytically converted to innocuous products in catalytic converter 8, and the resulting exhaust gas is discharged from catalytic converter 8 through line 9.

Engine 1 can be any internal combustion engine that produces an exhaust gas that contains sulfur oxides. For example, the invention is particularly useful in treating the exhaust gas from a spark ignition internal combustion engine which is operated with a gasoline fuel which contains organic sulfur compounds as impurities. The invention can also be used with a diesel engine which is operated with a fuel that contains sulfur compounds as impurities.

The invention can be used to process an exhaust gas that contains a wide range of sulfur oxide concentrations, for example, from less than about 0.01 ppm up to about 1%. However, the invention is best employed with exhaust gases that contain less than about 20 ppm of sulfur oxides. The invention is suitable for use in controlling sulfur oxide emissions from a gasoline operated automotive engine wherein the gasoline contains less than about 300 ppm of sulfur in the form of organic sulfur compounds. Preferably, the gasoline contains less than about 150 ppm and more preferably less than about 50 ppm of sulfur. These sulfur levels are significant only because they are a measure of the amount of sulfur that must be captured by sulfur oxide absorption zone 5, and of the quantity of sulfur oxide absorbent that must be used for this purpose in zone 5. For example, if a gasoline containing 50 ppm of sulfur and having a density of 6.5 pounds per gallon (0.7789 g/cm$^3$) is used as the fuel for an automobile that has an overall fuel economy of 20 miles per gallon (8.50 km/l), a total of 0.325 pounds (147 g) of sulfur will be discharged in the exhaust gas for every 20,000 miles (32,200 km) of operation. However, if the gasoline contains 150 ppm of sulfur, three times as much sulfur will be discharged in the exhaust gas. Accordingly, the invention provides a highly satisfactory and inexpensive method for the substantially complete elimination of sulfur oxide emissions from automotive engines that are operated on a low sulfur gasoline such as California Phase 2 reformulated gasoline which cannot have a sulfur content higher than 40 ppm.

If the exhaust gas from an engine were passed directly to a sulfur oxide absorbent and then to a catalytic converter, there would be a serious cold-start emission problem. Because of the thermal mass of the cold absorbent in the sulfur oxide absorption zone, the temperature of the exhaust gas will be drastically reduced by direct heat transfer to the absorbent during passage through this zone. Accordingly, during a significant period of time after a cold-start, effluent gases from the sulfur oxide absorption zone will be too cold to bring the catalytic converter to its light-off temperature. More specifically, the sulfur oxide adsorption zone will have to be first heated to the light-off temperature of the catalytic converter before its effluent gases are hot enough to bring the catalytic converter to this temperature. The consequence of this is a significant delay before the catalytic converter reaches its light-off temperature and an associated failure by the catalytic converter to destroy organic compounds (such as hydrocarbons) in the exhaust gas during the delay period.

In the practice of the present invention, heat exchanger 2 is used to remove heat from the engine exhaust gas before the gas is passed to sulfur oxide absorption zone 5 for removal of sulfur oxides. This heat is then put back into the exhaust gas after it is discharged from sulfur oxide absorption zone 5. As a consequence, catalytic converter 8 is brought to its light-off temperature more rapidly during cold-start periods. The effect of heat exchanger 2 is to eliminate a significant portion of the undesirable increase in cold-start hydrocarbon emissions that would otherwise be caused by inserting the thermal mass of the sulfur oxide absorption zone in front of the catalytic converter.

Heat exchanger 2 can be of any known design and can be constructed of any material which has suitable mechanical and thermal conductivity properties and is tolerant to the thermal and chemical environment created by a hot exhaust gas. Suitable materials include, but are not limited to, stainless steel and ceramics. A suitable heat exchanger 2 can, for example, comprise a first plurality of heat exchange passages which is in heat exchange relationship with a second plurality of heat exchange passages, wherein one set of heat exchange passages is used for the hot gases and the other is used for the cooler gases.

Figure 2:
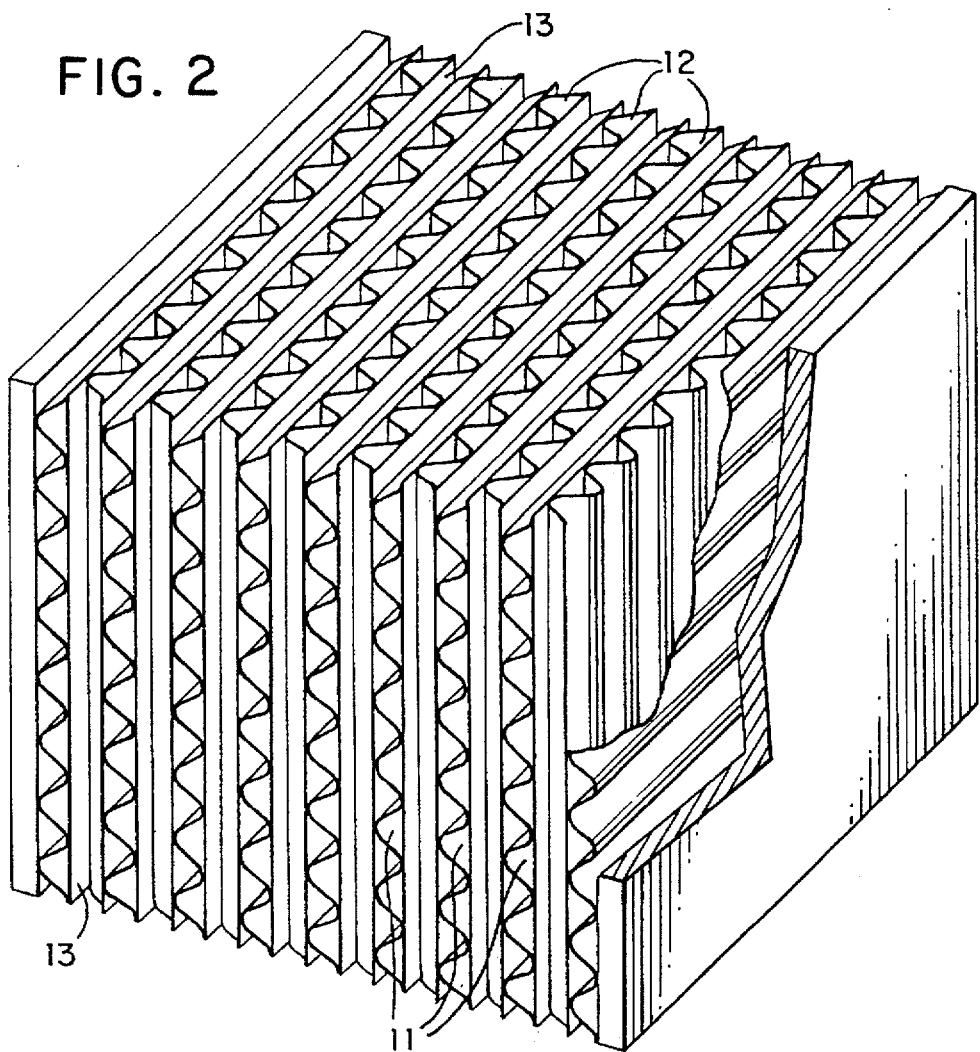
FIG. 2 of the drawings is a perspective, partially cut away view of a crossflow monolith which can be used as a heat exchanger in the practice of the invention.

A highly suitable structure for heat exchanger 2 is illustrated in FIG. 2. The structure of FIG. 2 is a crossflow monolith wherein horizontal passages 11 provide a first plurality of heat exchange passages and vertical passages 12 provide a second plurality of heat exchange passages, wherein the two sets of passages are in heat exchange relationship with each other. The passages of these two sets of heat exchange passages are disposed at right angles to each other, and adjacent passages 11 and 12 are separated by a thin wall 13. The structure of FIG. 2 can be formed by cementing together alternating, perpendicular rows of extruded ceramic ducts. Alternatively, similarly shaped metallic or ceramic-coated metallic structures may be produced and joined together by cementing or welding as appropriate.

The sulfur oxide absorbent used in sulfur oxide absorption zone 5 can be substantially any solid material that is capable of absorbing sulfur oxides at exhaust gas temperatures to yield a product which is thermally stable at exhaust gas temperatures. That is to say, the absorption of sulfur oxides from the exhaust gas by the sulfur oxide absorbent must be a process which is substantially irreversible thermally at the temperatures of its use. Preferably, the sulfur oxide absorbent will have a higher thermal decomposition temperature than any temperature it is expected to experience. The temperature of the exhaust gases from a conventional gasoline powered, spark ignition, internal combustion automotive engine when they reach absorption zone 5 can be at or near ambient temperature during cold-start periods and can be as high as about 800° C. during periods of sustained engine operation.

A highly suitable sulfur oxide absorbent for use in the practice of this invention is comprised of at least one metal oxide selected from the oxides of calcium, magnesium, strontium, barium and zinc. This sulfur oxide absorbent can also additionally comprise at least one oxide selected from the group consisting of the oxides of aluminum, silicon, copper, manganese, sodium, vanadium, iron, chromium, and the rare earth metals such as cerium, praseodymium, samarium and dysprosium. The sulfur oxide absorbent can also advantageously contain a small amount of a metal selected from the group consisting of ruthenium, rhodium, palladium, osmium, iridium, platinum and rhenium. In a preferred embodiment, the sulfur oxide absorbent will comprise a combination of: (1) at least one metal oxide selected from the oxides of calcium, magnesium, strontium, barium and zinc; and (2) at least one oxide selected from the oxides of aluminum and silicon; and (3) at least one metal selected from the group consisting of vanadium, iron, chromium, the platinum group metals (ruthenium, rhodium, palladium, osmium, iridium and platinum), rhenium and the rare earth metals. Although the invention is not to be so limited, it is believed that the presence in the sulfur oxide absorbent of a metal such as vanadium, iron, chromium, a platinum group metal, rhenium or a rare earth metal serves to enhance the efficiency of the absorbent by catalyzing the oxidation of sulfur dioxide in the exhaust gas to sulfur trioxide which is more easily captured by the absorbent.

By way of example, compositions consisting of a combination of 45 to 90 parts by weight of calcium as CaO, 5 to 30 parts by weight of $SiO_2$, and 5 to 25 parts by weight of sodium as $Na_2O$ are suitable sulfur oxide absorbents for use in the practice of this invention. The preparation of such materials is disclosed in U.S. Pat. No. 3,443,886 (Taylor et al.). In addition, such materials can be promoted by combination with a metal oxide selected from the group consisting of the oxides of Cu, Mn, V, Cr, Fe, Co, Ni and Mo. These promoted materials are also suitable for use in the practice of this invention, and their preparation is disclosed in U.S. Pat. No. 3,429,656 (Taylor et al.).

Unexpectedly, we have found that many of the materials that have been developed to suppress the emission of sulfur oxides from catalyst regeneration in the fluidized catalytic cracking ("FCC") process are highly suitable for use as a sulfur oxide absorbent in the practice of this invention. The fluidized catalytic cracking process is one of the principal industrial processes currently used for the manufacture of gasoline. In this process, a high boiling point hydrocarbon feedstock is converted to a lower boiling point product by contact with a cracking catalyst at elevated temperatures. The catalyst becomes deactivated in the course of the process as a result of coke deposits that form on the catalyst. Accordingly, the catalyst must be periodically regenerated by combustion of these coke deposits. This regeneration process results in the formation of an effluent gas which contains sulfur oxides, and the quantity of sulfur oxides produced is a function of the sulfur content of the hydrocarbon feedstock. Certain catalyst additives have been developed which can be added to the cracking catalyst which are highly effective in suppressing the discharge of sulfur oxides from catalyst regeneration. It is believed that these additives function by absorbing sulfur oxides in the oxidizing environment of the regeneration stage of the process and releasing the absorbed sulfur oxides, perhaps as hydrogen sulfide, in the reducing environment of the reaction zone where the hot cracking catalyst is contacted with hydrocarbon feedstock. In effect, these catalyst additives for the FCC process are used to transport sulfur from the regeneration zone to the reaction zone. Accordingly, it is surprising that these FCC catalyst additives are highly suitable for use in the practice of this invention.

Highly satisfactory sulfur oxide absorbents for use in this invention comprise an inorganic oxide composition in association with at least one free or combined metal selected from the group consisting of vanadium, iron, lanthanum, cerium, praseodymium, samarium and dysprosium, wherein the inorganic oxide composition comprises at least one member selected from the group consisting of mixtures of magnesium oxide with aluminum oxide, $MgAl_2O_3 \cdot xAl_2O_3$, and $MgAl_2O_4 \cdot yMgO$ wherein x is from 0 to 10 and y is from 0 to 10. The ratio by weight of the inorganic oxide composition to the metal or metals in such a material is preferably in the range from about 1.0 to about 1,000. Materials of this type have been utilized as catalyst additives for the FCC process, and the preparation of such materials is disclosed in U.S. Pat. Nos. 4,469,589 (Yoo et al.), 4,472,267 (Yoo et al.), and 4,497,902 (Bertolacini et al.). Such a material which consists of cerium and vanadium in combination with $MgAl_2O_4 \cdot MgO$ has been found to have the ability to increase its weight by 47% through absorption of sulfur dioxide at a temperature of about 735° C. from a mixture of gases consisting of 5000 ppm of sulfur dioxide and 2% oxygen in helium.

Another highly satisfactory sulfur oxide absorbent for use in this invention comprises a material of the formula:

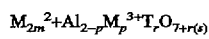

$$M_{2m}^{2+}Al_{2-p}M_p^{3+}T_rO_{7+r(s)}$$

where m is about 1.1 to about 3.5; p is about 0.01 to about 0.4; $M^{2+}$ is a divalent metal selected from the group consisting of magnesium, calcium, zinc, barium and strontium; $M^{3+}$ is a trivalent metal selected from the group consisting of cerium, lanthanum, iron, chromium, vanadium and cobalt; T is vanadium, tungsten or molybdenum; r is about 0.01 to about 0.2; and s is 2.5 when T is vanadium or 3 when T is tungsten or molybdenum. Materials of this type have also been suggested for use as catalyst additives for the FCC process, and their preparation is disclosed in U.S. Pat. No. 5,426,083 (Bhattacharyya et al.) Such a material, which is described in the Bhattacharyya et al. patent, is of the formula:

$$Mg_4Al_{1.796}Ce_{0.204}V_{0.074}O_{7.185}$$

and has the ability to increase its weight by 84.6% through absorption of sulfur dioxide at a temperature of about 735° C. from a mixture of gases consisting of 5000 ppm of sulfur dioxide and 2% oxygen in helium.

The suitability of a variety of metal oxides and carbonates (including those of sodium, potassium, magnesium, calcium, barium, aluminum, manganese, iron, copper and zinc) as absorbents for sulfur trioxide emissions in automotive exhaust gases has been extensively discussed by William R. Leppard in report No. EPA-460/3-75-002-a prepared for the U.S. Environmental Protection Agency under Contract No. 68-03-0497 and dated November 1974. The teaching of this reference is hereby incorporated by reference.

The sulfur oxide absorbent can be used in any desired form. For example, it can be used in the form of particles, pellets, beads or monoliths. In addition, the sulfur oxide absorbent can be either placed on a support or incorporated into another material which can serve either as a binder or a support. Conventional ceramic supports can be used for this purpose. Silica and alumina can be used either as a support or as a binder for the sulfur oxide absorbent. For example, silica and/or alumina can be advantageously used either as a support or binder for magnesium oxide or calcium oxide. If desired, the absorbent can be used in the form of pellets or beads disposed in a flow-through canister to provide a bed of absorbent through which the exhaust gas flows. Desirably, the sulfur oxide absorbent will be used in a physical form which will permit a rapid and effective contacting with the exhaust gas without creating substantial amounts of back-pressure which can adversely affect engine performance. Preferably, the sulfur oxide absorbent will comprise a particulate solid wherein the largest dimension of the particles has an average value which is in excess of about 1 millimeter. For example, pellets or rods of about 0.10 to 0.60 cm diameter and 0.25 to 2.54 cm length can be used in the practice of the invention.

The amount of sulfur oxide absorbent used in sulfur oxide absorption zone 5 is preferably effective to absorb an amount of sulfur oxides, calculated on the basis of sulfur content, which is equal to at least about 100 grams of sulfur. More preferably, the amount of sulfur oxide absorbent used in zone 5 will be effective to absorb an amount of sulfur oxides, calculated on the basis of sulfur content, which is equal to at least about 200 grams of sulfur. In addition, the sulfur oxide absorbent should be effective to absorb an amount of sulfur oxides, calculated on the basis of sulfur content, which is desirably equal to at least about 10% and preferably equal to at least about 20% of the absorbent's weight. Desirably, the sulfur oxide absorbent is effective to absorb at least about 50% of the sulfur oxides which are passed into sulfur oxide absorption zone 5. Preferably, at least about 80% of the sulfur oxides passed into sulfur oxide absorption zone 5 are absorbed by the sulfur oxide absorbent.

The sulfur oxide absorption zone 5 can be constructed of any material which has suitable mechanical properties and is tolerant to the thermal and chemical environment created by a hot exhaust gas. Suitable materials include, but are not limited to, stainless steel and ceramics. If desired, the sulfur oxide absorption zone 5 can be constructed for convenient replacement.

If desired, air can be added to the exhaust gas before it enters sulfur oxide absorption zone 5. It will be appreciated, of course, that the added air will serve to cool the exhaust gas. Accordingly, it is preferred to extract heat from the exhaust gas with heat exchanger 2 before adding any such supplemental air to the exhaust gas. Desirably, the amount of air used will be at least enough, on a stoichometric basis, to oxidize any oxidizable carbon containing materials (such as carbon monoxide and organic compounds) to carbon dioxide and water. Although the invention is not to be so limited, it is believed that the presence of excess oxygen serves to enhance the ability of the sulfur oxide absorbent in zone 5 to absorb sulfur oxides because this excess oxygen promotes the conversion of sulfur dioxide to sulfur trioxide which is more easily absorbed. For the same reason, it is believed that the presence in the sulfur oxide absorbent of a metal such as vanadium, iron, chromium, a platinum group metal, rhenium or a rare earth metal serves to enhance the efficiency of the absorbent by catalyzing the oxidation of sulfur dioxide in the exhaust gas to sulfur trioxide which is more easily captured by the absorbent.

The addition of air to the exhaust gas before it enters sulfur oxide absorption zone 5 can be advantageous when the engine is operated with a rich air/fuel mixture to produce an exhaust gas which is reducing in character. The addition of air to such a reducing exhaust gas can be used to minimize or prevent any possible release of a sulfur containing gas, such as hydrogen sulfide, which might occur by reduction of sulfur oxides which have been absorbed by the sulfur oxide absorbent in absorption zone 5. Such supplemental air can, of course, also react with the reducing components of the exhaust gas and thereby prevent their discharge as undesirable emissions. Any air pump or blower of conventional design can be used to provide the supplemental air.

Figure 3:
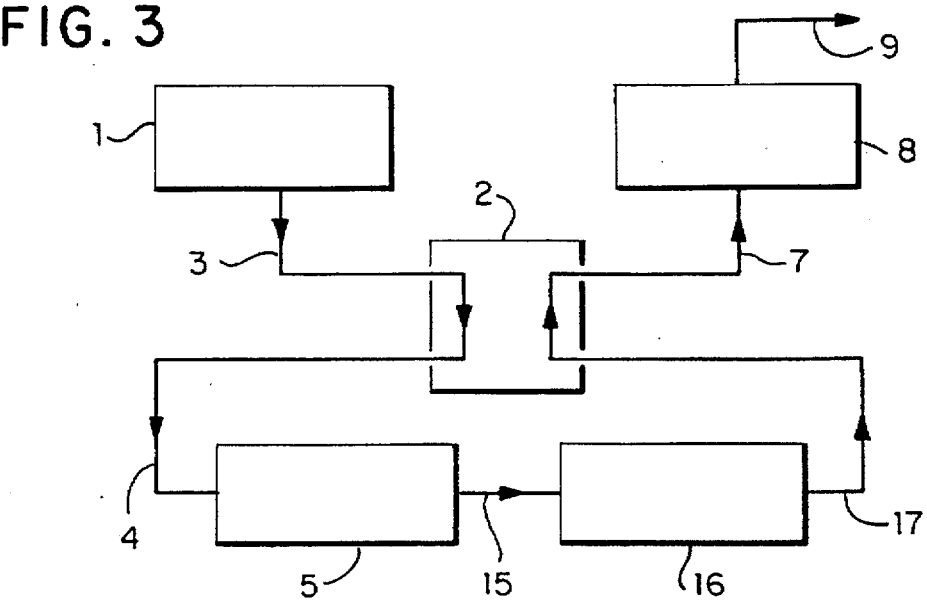
FIG. 3 of the drawings is a schematic representation of a second embodiment of the invention.

In a highly preferred embodiment of the invention, a hydrocarbon adsorbent is used in combination with the sulfur oxide absorbent. In such an embodiment, sulfur oxide absorption zone 5 can additionally comprise the hydrocarbon adsorbent. Alternatively, the hydrocarbon adsorbent can be placed in a supplemental contacting zone which is located either upstream or downstream of sulfur oxide absorption zone 5, wherein "upstream" and "downstream" refer to the flow of the exhaust gas, and upstream indicates a location in the exhaust gas before the gas passes through zone 5, while downstream indicates a location in the exhaust gas after its passage through zone 5. However, it will be appreciated that the supplemental hydrocarbon adsorption zone should be located at a position downstream from the "hot side" of heat exchanger 2 but upstream from "cold side" of heat exchanger 2, wherein "hot side" refers to the side of the heat exchanger that receives hot exhaust gas before it is passed to either sulfur oxide absorption zone 5 or the supplemental hydrocarbon adsorption zone. Similarly, "cold side" refers to the side of the heat exchanger that receives the exhaust gas after passage through sulfur oxide absorption zone 5 and the supplemental hydrocarbon adsorption zone. FIG. 3 illustrates that embodiment of the invention wherein a supplemental hydrocarbon adsorption zone 16 is located downstream of sulfur oxide absorption zone 5.

With reference to FIG. 3, exhaust gas from engine 1 flows through line 3 to heat exchanger 2 where heat is transferred from the hot exhaust gas to heat exchanger 2. The cooled exhaust gas then flows from heat exchanger 2 through line 4 to sulfur oxide absorption zone 5. The exhaust gas then passes through sulfur oxide absorption zone where sulfur oxides are removed from the exhaust gas through contact with a sulfur oxide absorbent. Effluent gas from sulfur oxide absorption zone 5 passes through line 15 to hydrocarbon adsorption zone 16 where the exhaust gas is contacted with a hydrocarbon adsorbent. Effluent gas from hydrocarbon adsorption zone 16 is passed through line 17 to heat exchanger 2 where it is heated by the heat that it previously gave up during its initial passage through heat exchanger 2 via line 3. The heated exhaust gas is then discharged from heat exchanger 2 through line 7 and is passed to catalytic converter 8 where it is contacted with a catalyst which can catalyze the conversion of carbon monoxide and organic compounds in the exhaust gas to innocuous products. Finally, the resulting exhaust gas is discharged from catalytic converter 8 through line 9.

As previously noted, the effect of heat exchanger 2 is to eliminate a significant portion of the undesirable increase in cold-start hydrocarbon emissions that would otherwise be caused by inserting the thermal mass of the sulfur oxide absorption zone in front of the catalytic converter. However, by itself, heat exchanger 2 cannot totally eliminate the discharge of hydrocarbon emissions during engine cold-start periods because catalytic converter 8 cannot be brought immediately to its light-off temperature. Accordingly, the use of a hydrocarbon adsorbent in the practice of this invention is a highly preferred embodiment because the hydrocarbon adsorbent serves to: (1) adsorb at least a portion of the organic compounds in the exhaust gas under the low temperature conditions which are characteristic of engine cold-start, and (2) desorb the adsorbed organic compounds under the higher temperature conditions which result after the engine has operated briefly and the catalytic converter has reached its light-off temperature. The combined use of a hydrocarbon adsorbent with a sulfur oxide absorbent in the practice of this invention makes possible the highly effective control of both sulfur oxide emissions and cold-start hydrocarbon emissions. In the embodiment illustrated in FIG. 3, sulfur oxide absorption zone 5 is located upstream from from supplemental hydrocarbon adsorption zone 16. In this arrangement, the thermal mass of sulfur oxide absorption zone 5 enhances the ability of the hydrocarbon adsorbent in zone 16 to control cold-start hydrocarbon emissions. Because of this thermal mass, hydrocarbon adsorption zone 16 does not heat up as rapidly as it would in the absence of sulfur oxide absorption zone 5. Accordingly, the hydrocarbon adsorbent can adsorb hydrocarbons for a longer period of time and catalytic converter 8 has this longer period of time to reach its light-off temperature.

The hydrocarbon adsorbent can be comprised of any of the known materials which are suitable for adsorbing organic compounds, such as hydrocarbons, from an exhaust gas at the low temperatures which are typical of an engine cold-start and desorbing them at the higher temperatures which are reached after sustained engine operation. Such materials include, but are not limited to, activated alumina, porous glass, silica gel, activated carbon, and both natural and synthetic molecular sieves. Suitable molecular sieves include faujasite, mordenite, chabazite, silicalite, Beta zeolite, zeolite X, zeolite Y, and ZSM-5 zeolite. For example, Union Carbide ultrastable Y sieves such as LZY-72 and LZY-82 are satisfactory hydrocarbon adsorbents. While activated carbon is an excellent adsorbent, its use in this invention is not preferred since it can be damaged by sustained exposure to a high temperature exhaust gas. For this reason, activated carbon should not be used except where the exhaust gas constituents will not oxidize the carbon significantly and where the hydrocarbon adsorbent temperature is sufficiently low to ensure continued operability of a carbon adsorbent.

The hydrocarbon adsorbent can be used in any desired form. For example, it can be used in the form of particles, pellets, beads or monoliths. In addition, the hydrocarbon adsorbent can be either placed on a support or incorporated into another material which can serve either as a binder or a support. Conventional ceramic or metal supports can be used for this purpose. Silica and alumina can be used either as a support or as a binder for the hydrocarbon adsorbent. For example, silica and/or alumina can be advantageously used either as a support or binder for a molecular sieve such as a Beta zeolite. If desired, the adsorbent can be used in the form of pellets or beads in a flow-through canister to provide an adsorbent bed through which the exhaust gas flows. Desirably, the hydrocarbon adsorbent will be used in a physical form which will permit a rapid and effective contacting with the exhaust gas without creating substantial amounts of back-pressure which can adversely affect engine performance. Preferably, the hydrocarbon adsorbent will comprise a particulate solid wherein the largest dimension of the particles has an average value which is in excess of about 1 millimeter. For example, pellets or rods of about 0.10 to 0.60 cm diameter and 0.25 to 2.54 cm length can be used in the practice of the invention. In a highly preferred embodiment, the hydrocarbon adsorbent is deposited on a solid monolithic carrier. For example, the hydrocarbon adsorbent can be applied as a thin film or coating on an inert carrier material which provides structural support for the adsorbent. The carrier material can be any refractory material which is stable under the conditions created by exposure to a hot exhaust gas. Such materials include conventional ceramics and metals. Conventional hydrocarbon adsorbents and their use to reversibly adsorb hydrocarbons from an exhaust gas are disclosed in U.S. Pat. No. 5,303,547 (Mieville et al.) and in Published International Patent Application No. WO 94/11623 (Burk et al.).

With reference to FIG. 1, sulfur oxide absorption zone 5 can comprise both a sulfur oxide absorbent and a hydrocarbon adsorbent. These two materials can be combined in any desired manner. For example, the hydrocarbon adsorbent can be a separate particulate solid which is physically mixed with particles of the sulfur oxide absorbent. It will be appreciated, of course, that these particles can be either pellets or beads of an appropriate size. Alternatively, the hydrocarbon adsorbent and the sulfur oxide absorbent can be combined so that both materials are contained in the same particles, pellets or beads. For example, a sulfur oxide absorbent such as magnesium or calcium oxide can be combined with a hydrocarbon adsorbent such as an ultrastable Y zeolite or a Beta zeolite using silica and alumina as a binder or matrix. Such a composite can be used in the form of pellets or beads within a flow-through canister to provide a bed of the composite material through which the exhaust gas flows. Desirably, the composite material will be used in a physical form which will permit a rapid and effective contacting with the exhaust gas without creating substantial amounts of back-pressure which can adversely affect engine performance.

With reference to FIGS. 1 and 3, catalytic converter 8 can be of any conventional type which is known to the art and will contain a catalyst which is effective to catalyze the oxidation of at least a portion of the carbon monoxide and organic compounds, such as hydrocarbons, in the exhaust gas to innocuous products. Such catalysts generally comprise one or more of the platinum group metals which consist of ruthenium, rhodium, palladium, osmium, iridium and platinum. Occasionally, the platinum group metal or metals are combined with one or more additional metals. Such additional metals include, but are not limited to, chromium, copper, vanadium, cobalt, nickel and iron. Suitable catalysts include the type which are commonly referred to as "three-way conversion" or "TWC" catalysts. The TWC catalysts can comprise, for example, combinations of: (1) platinum and rhodium; or (2) palladium and rhodium; or (3) platinum, palladium and rhodium. The platinum group metals of the TWC catalyst can be deposited on any suitable refractory substrate. Such substrates include, but are not limited to, alumina, ceria and zirconia. The support can be of any desired form, for example, particles, pellets, beads or monoliths. The catalytic metals can be combined with a support either during or after preparation of the support. One method consists of impregnating a suitable support with an aqueous or organic solution or dispersion of a suitable compound or compounds of the catalytic metal or metals. The impregnation can be carried out in any manner which will not destroy the structure of the support. After drying, the composite can be calcined, if desired. Alternatively, a suitable compound or compounds of the catalytic metals can be combined with a support precursor prior to a physical forming step such as extrusion. If desired, the catalytic metals can be deposited on or in a monolithic support by wash-coating a previously-prepared support or by mixing the catalytic metals into the ceramic batch material prior to extrusion.

Figure 4:
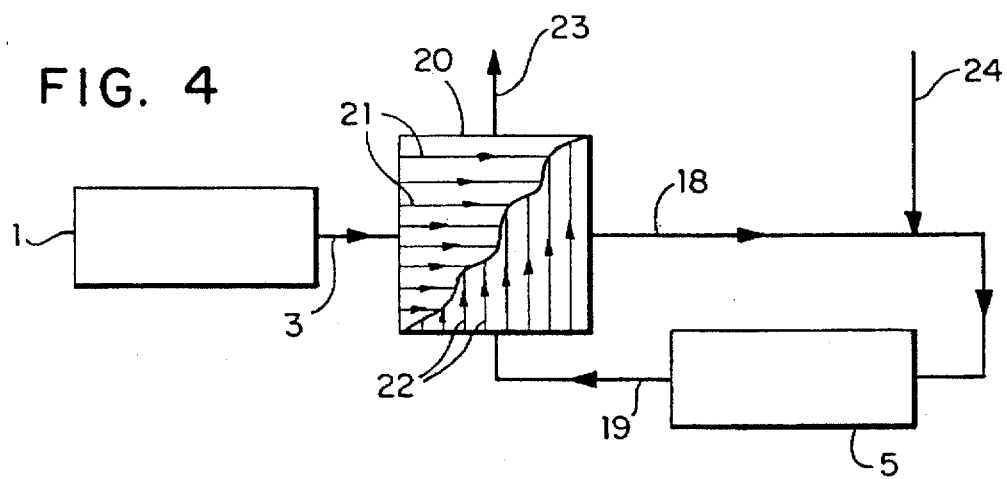
FIG. 4 of the drawings is a schematic representation of a third embodiment of the invention.

A highly preferred embodiment of the invention is schematically illustrated in FIG. 4. In this embodiment, a catalytic converter 20 is used which comprises a heat exchange structure. In this embodiment, exhaust gas from engine 1 flows through line 3 to catalytic converter 20. The exhaust gas then flows through a first plurality of heat exchange passages 21 in catalytic converter 20. Exhaust gas is then conveyed through line 18 to sulfur oxide absorption zone 5 and passed through this zone 5 where sulfur oxides are removed from the exhaust gas through contact with a sulfur oxide absorbent. Effluent gas from sulfur oxide absorption zone 5 passes through line 19 to catalytic converter 20 where the gas flows through a second plurality of heat exchange passages 22 which are in heat exchange relationship with the first plurality of heat exchange passages 21. Finally, the resulting exhaust gas is discharged from catalytic converter 20 through line 23. In this embodiment, the catalyst or catalysts of the catalytic converter are placed within either: (1) the second plurality of heat exchange passages 22, or (2) both the first and second pluralities of heat exchange passages 21 and 22. It will be appreciated, of course, that when a catalyst is used in both the first and second pluralities of heat exchange passages 21 and 22, one type of catalyst can be used in passages 21 and a different type can be used in passages 22. The catalytic converter 20 of this embodiment is conveniently constructed from crossflow monolith such as that illustrated in FIG. 2. If desired, supplemental air can be added through line 24 and mixed with the exhaust gas before it is passed into sulfur oxide absorption zone 5.

With reference to the embodiment of the invention illustrated by FIG. 4 wherein the catalyst of catalytic converter 20 is contained only in the plurality of second heat exchange passages 22, heat is efficiently extracted from the hot engine exhaust gas and used to heat the catalytically-active passages 22 through indirect heat exchange. During engine cold-start periods, the flow of exhaust gas through passages 21 heats catalytically-active passages 22 and simultaneously lowers the exhaust gas temperature before the gas reaches sulfur oxide absorption zone 5. In this manner, the catalyst is rapidly heated to its light-off temperature, and cold-start hydrocarbon emissions are minimized. Simultaneously, sulfur oxides are removed in sulfur oxide absorption zone 5, thereby preventing their discharge into the atmosphere as pollutants and also protecting the catalyst in heat exchange passages 22 from the deactivating effect of these materials. As disclosed above, it is preferred to use a hydrocarbon adsorbent in combination with the sulfur oxide absorbent of zone 5, wherein the sulfur oxide absorption zone 5 can additionally comprise the hydrocarbon adsorbent or, alternatively, the hydrocarbon adsorbent can be placed in a supplemental contacting zone which is located either upstream or downstream of zone 5.

With reference to the embodiment of the invention illustrated by FIG. 4, wherein the catalyst of catalytic converter 20 is contained in both first and second pluralities of heat exchange passages 21 and 22, the catalyst contained in passages 21 begins to function almost immediately upon contact with the hot engine gases to convert at least a portion of the carbon monoxide and organic compounds, such as hydrocarbons, to innocuous products. In addition, the catalyst in passages 21 also improves the ability of the sulfur oxide absorbent in zone 5 to capture sulfur oxides. Although the invention is not to be so limited, it is believed that the catalyst in passages 21 catalyzes the conversion of sulfur dioxide to sulfur trioxide which is more easily captured by the sulfur oxide absorbent. However, during engine cold-start periods, some of these undesirable emissions will not be converted by the catalyst in passages 21 because the catalyst has not reached its light-off temperature. In addition, the catalyst in passages 21 will typically have a somewhat reduced catalytic activity because of its exposure to sulfur compounds in the exhaust gas. Any organic compounds, such as hydrocarbons, and carbon monoxide that are not converted to innocuous products in passages 21 are subsequently presented to the catalyst in passages 22 after it has been heated by indirect heat exchange and after the removal of sulfur oxides from the exhaust gas in sulfur oxide absorption zone 5. The catalyst in passages 22 will be rapidly heated to its light-off temperature by indirect heat exchange, and it will also be protected from the deactivating effect of sulfur oxides by sulfur oxide absorption zone 5. As disclosed above, it is preferred to use a hydrocarbon adsorbent in combination with the sulfur oxide absorbent of zone 5. For example, the sulfur oxide absorption zone 5 can additionally comprise the hydrocarbon adsorbent or, alternatively, the hydrocarbon adsorbent can be placed in a supplemental contacting zone which is located either upstream or downstream of zone 5.

Figure 5:
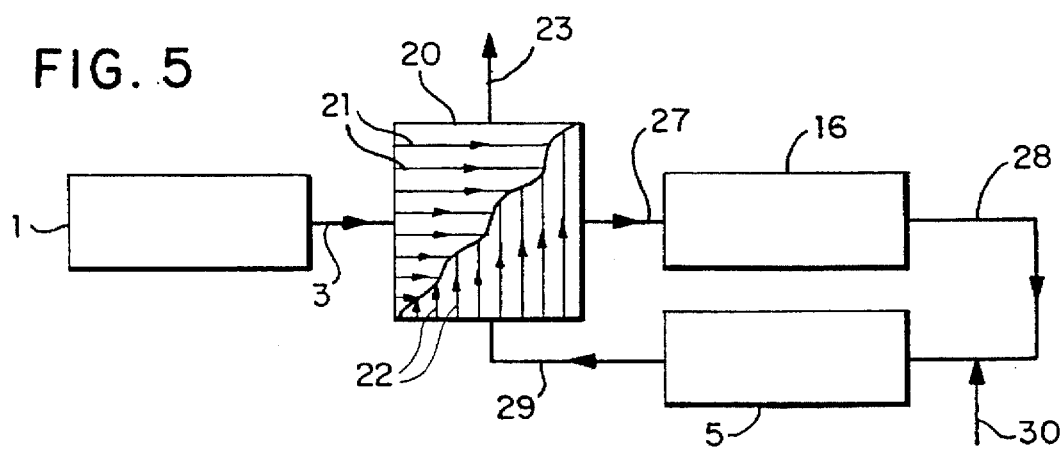
FIG. 5 of the drawings is a schematic representation of a fourth embodiment of the invention.

The use of a hydrocarbon adsorbent in a hydrocarbon adsorption zone 16 upstream of sulfur oxide absorption zone 5 is illustrated in FIG. 5. In this embodiment, exhaust gas from engine 1 flows through line 3 to catalytic converter 20. The exhaust gas then flows through a first plurality of heat exchange passages 21 in catalytic converter 20. Exhaust gas is then conveyed through line 27 to hydrocarbon adsorption zone 16 where it is contacted with a hydrocarbon adsorbent. Effluent gas from hydrocarbon adsorption zone 16 flows through line 28 to sulfur oxide absorption zone 5 where it is contacted with a sulfur oxide absorbent. Effluent gas from sulfur oxide absorption zone 5 passes through line 29 to catalytic converter 20 where the gas flows through a second plurality of heat exchange passages 22 which are in heat exchange relationship with the first plurality of heat exchange passages 21. Finally, the resulting exhaust gas is discharged from catalytic converter 20 through line 23. If desired, supplemental air can be added through line 30 to the exhaust gas before it is passed into sulfur oxide absorption zone 5.

U.S. Pat. No. 5,303,547 (Mieville et al.) and Published International Patent Application No. WO 94/11623 (Burk et al.) disclose catalytic converters which comprise a heat exchanger. Catalytic converters disclosed in these references are suitable for use in the practice of the embodiments of this invention which are illustrated in FIGS. 4 and 5, and these references are incorporated herein by reference.

The use of a first catalyst to contact the exhaust gas before it is passed through the sulfur oxide absorbent and a second catalyst to contact the effluent gas from the sulfur oxide absorbent permits the use of alternative gas treatment regimes in which the different components of a multifunction catalyst can be preferentially distributed throughout different regions of the exhaust gas treatment system. For example, in an embodiment of the type shown in FIGS. 4 and 5 wherein a catalyst is employed in both first and second pluralities of heat exchange passages 21 and 22, a nitrogen oxide reducing catalyst such as those that contain rhodium, ruthenium or similar metals can be used in the plurality of first heat exchange passages 21 and a platinum or standard three-way conversion catalyst can be used in the plurality of second heat exchange passages 22. In this embodiment, the engine can be operated with a rich air/fuel mixture which will provide a reducing environment in the first passages 21 which will enhance the conversion of nitrogen oxides to nitrogen. Supplemental air can then be added to the exhaust gas before it is passed through the sulfur oxide absorbent or the second passages 22. The oxygen provided by this supplemental air serves to enhance the absorption of sulfur oxides by the sulfur oxide absorbent and also serves to ensure the effective conversion of carbon monoxide and organic compounds, such as hydrocarbons, to innocuous products upon contact with the catalyst in the second passages 22. If it is desired to use a hydrocarbon adsorbent which is damaged or rendered ineffective by continued exposure to oxygen, such as activated carbon, this hydrocarbon adsorbent can be placed in a hydrocarbon adsorption zone 16 which is upstream from the sulfur oxide absorption zone 5 as shown in FIG. 5. The supplemental air can then be added through line 30 to the effluent from hydrocarbon adsorption zone 16 before the effluent is passed into sulfur oxide absorption zone 5 as illustrated in FIG. 5.

We claim:

1. A method for reducing the concentration of carbon monoxide, organic compounds and sulfur oxides in an exhaust gas from an internal combustion engine which comprises:
   (a) contacting the exhaust gas with a sulfur oxide absorbent in a first contacting zone and absorbing with the sulfur oxide absorbent at least a portion of the sulfur oxides in the exhaust gas wherein said sulfur oxide absorption is substantially irreversible at temperatures which are less than or equal to that of said exhaust gas;
   (b) contacting the effluent gas from said first contacting zone with a catalyst in a second contacting zone and catalyzing the conversion of at least a portion of the carbon monoxide and organic compounds in the effluent gas from said first contacting zone to innocuous products; and
   (c) transferring heat from the exhaust gas to said second contacting zone by indirect heat exchange.

2. The method of claim 1 wherein the sulfur oxide absorbent comprises at least one metal oxide selected from the group consisting of the oxides of calcium, magnesium, strontium, barium and zinc.

3. The method of claim 2 wherein said sulfur oxide absorbent additionally comprises at least one oxide selected from the group consisting of the oxides of aluminum, silicon, copper, manganese, sodium, vanadium, iron, chromium and the rare earth metals.

4. The method of claim 2 wherein the sulfur oxide absorbent additionally comprises at least one metal selected from the group consisting of ruthenium, rhodium, palladium, osmium, iridium, platinum and rhenium.

5. The method of claim 1 wherein the sulfur oxide absorbent comprises an inorganic oxide composition in association with at least one additional material selected from the group consisting of vanadium, iron, lanthanum, cerium, praseodymium, samarium and dysprosium, and said inorganic oxide composition comprises at least one member selected from the group consisting of mixtures of magnesium oxide with aluminum oxide, $MgAl_2O_4 \cdot xAl_2O_3$, and $MgAl_2O_4 \cdot yMgO$ wherein x is from 0 to 10 and y is from 0 to 10.

6. The method of claim 5 wherein the ratio by weight of inorganic oxide composition to said other materials is from about 1.0 to about 1,000.

7. The method of claim 1 which comprises flowing the exhaust gas through a first plurality of heat exchange passages which is in heat exchange relationship with a second plurality of heat exchange passages which define the second contacting zone and contain the catalyst.

8. The method of claim 1 wherein said first contacting zone additionally contains a hydrocarbon adsorbent and the method further comprises:
   (a) adsorbing with the hydrocarbon adsorbent at least a portion of the organic compounds in the exhaust gas under the low temperature conditions in the first contacting zone which are characteristic of engine cold-start; and
   (b) desorbing adsorbed organic compounds from the hydrocarbon adsorbent under higher temperature conditions in the first contacting zone after the engine has operated for a period of time.

9. The method of claim 8 wherein said hydrocarbon adsorbent comprises a molecular sieve component.

10. The method of claim 8 wherein the hydrocarbon adsorbent is a separate particulate solid which is physically mixed with particles of the sulfur oxide absorbent.

11. The method of claim 8 wherein the hydrocarbon adsorbent and the sulfur oxide absorbent comprise a particulate solid and are contained in the same particles.

12. The method of claim 1 wherein the amount of sulfur oxide absorbent in said first contacting zone is effective to absorb an amount of sulfur oxides, calculated on the basis of sulfur content, which is equal to at least about 100 grams of sulfur.

13. The method of claim 1 wherein said sulfur oxide absorbent is effective to absorb at least about 50% of the sulfur oxides in said exhaust gas.

14. The method of claim 1 wherein the sulfur oxide absorbent is effective to absorb an amount of sulfur oxides, calculated on the basis of sulfur content, which is equal to at least about 20% of the absorbent's weight.

15. The method of claim 1 wherein the sulfur oxide absorbent comprises a material of the formula:

$$M_{2m}^{2+}Al_{2-p}M_p^{3+}T_rO_{7+r(s)}$$

where m is about 1.1 to about 3.5; p is about 0.01 to about 0.4; $M^{2+}$ is a divalent metal selected from the group consisting of magnesium, calcium, zinc, barium and strontium; $M^{3+}$ is a trivalent metal selected from the group consisting of cerium, lanthanum, iron, chromium, vanadium and cobalt; T is vanadium, tungsten or molybdenum; r is about 0.01 to about 0.2; and s is 2.5 when T is vanadium or 3 when T is tungsten or molybdenum.

16. An apparatus for reducing the concentration of carbon monoxide, organic compounds and sulfur oxides in an exhaust gas from an internal combustion engine which comprises:
- (a) absorber means which comprises a sulfur oxide absorbent for absorbing at least a portion of the sulfur oxides in the exhaust gas in a substantially irreversible manner at temperatures which are less than or equal to that of said exhaust gas;
- (b) catalytic converter means for receiving effluent gas from the absorber means, wherein said catalytic converter means comprises a catalyst which is effective for catalyzing the conversion of hydrocarbons into innocuous products; and
- (c) heat exchange means for transferring heat from the exhaust gas to the catalytic converter means by indirect heat exchange before said exhaust gas enters the absorber means.

17. The apparatus of claim 16 wherein the sulfur oxide absorbent comprises at least one metal oxide selected from the group consisting of the oxides of calcium, magnesium, strontium, barium and zinc.

18. The apparatus of claim 17 wherein said sulfur oxide absorbent additionally comprises at least one oxide selected from the group consisting of the oxides of aluminum, silicon, copper, manganese, sodium, vanadium, iron, chromium and the rare earth metals.

19. The apparatus of claim 16 wherein the sulfur oxide absorbent comprises an inorganic oxide composition in association with at least one free or combined metal selected from the group consisting of vanadium, iron, lanthanum, cerium, praseodymium, samarium and dysprosium, and said inorganic oxide composition comprises at least one member selected from the group consisting of mixtures of magnesium oxide with aluminum oxide, $MgAl_2O_4 \cdot xAl_2O_3$, and $MgAl_2O_4 \cdot yMgO$ wherein x is from 0 to 10 and y is from 0 to 10.

20. The apparatus of claim 16 wherein the heat exchange means comprises a first plurality of heat exchange passages which is in heat exchange relationship with a second plurality of heat exchange passages and wherein the catalytic converter means comprises said second plurality of heat exchange passages.

21. The apparatus of claim 16 wherein the absorber means additionally comprises a hydrocarbon adsorbent which is effective to adsorb at least a portion of the organic compounds in the exhaust gas under the low temperature conditions which are typical of engine cold-start and desorb them at the higher temperatures which are reached after sustained engine operation.

22. The apparatus of claim 21 wherein said hydrocarbon adsorbent comprises a molecular sieve component.

23. The apparatus of claim 22 wherein said molecular sieve component comprises at least one material selected from the group consisting of faujasite, mordenite, chabazite, silicalite, Beta zeolite, zeolite X, zeolite Y and ZSM-5 zeolite.

* * * * *